Patented Feb. 14, 1928.

1,659,403

UNITED STATES PATENT OFFICE.

GEORGE CHARLES LEWIS, OF NEW DORP, NEW YORK, ASSIGNOR TO COLUMBIAN CARBON COMPANY, OF WILLIAMSPORT, PENNSYLVANIA, A CORPORATION OF DELAWARE.

MANUFACTURE OF PIGMENTS.

No Drawing. Application filed September 9, 1926. Serial No. 134,575.

This invention relates to the manufacture of pigments particularly suitable for use in printing ink, lacquers, paints, varnishes, etc. The raw material from which the pigment is made may be lignite, peat, or such product that originated as vegetable matter. Even the excreta from herbivorous animals such as cattle and sheep, may be employed.

In carrying out my improved process, the material of the character above referred to, is treated with an alkali such as sodium hydroxide. As a result of this treatment which may be effected in various different ways, there is produced a clear dark brown solution which may be separated from the insoluble matter by filtering, decanting, or other ways. This brown solution is then acidified, whereby there is formed a brown precipitate which constitutes my improved pigment.

For use in lacquers, paints, varnishes, and some printing inks, this precipitate may be dried and incorporated in the vehicle of the lacquer, paint, or the like. For certain forms of inks and paints where an aqueous vehicle or base is employed, it is only necessary to wash the precipitate, and the drying may be omitted.

This brown substance which contains decayed vegetable matter, is a form of humic acid, and the material, whether peat, lignite, or the like, belongs to the broad class of compounds known as humus.

I have found that different shades of pigment are produced when different alkalis and acids are used. For instance, the solution formed by treating with sodium hydroxide has a different shade from that formed when treated with potassium hydroxide, even when precipitated by the same acid.

I have also found that the solution made from one alkali, such as sodium hydroxide, gives different shades of pigment when precipitated by different acids, such for instance as acetic acid or sulphuric acid.

A further feature of my invention is that I have discovered that the residue after the leaching of the humus is a good crude material for the manufacture of an activated decolorizing and absorbent carbon. This residue may be treated by the well known process of heating in the absence of air to over 1200 F., and acid washing to remove sulphides and inorganic impurities.

Having thus described my invention, what I claim as new and desire to secure by Letters Patent is:

1. The production of a pigment which includes the steps of treating humus with an alkaline solution, separating the insoluble matter from the solution, and precipitating the pigment from the solution by the action of an acid.

2. The process of producing a brown pigment which consists in forming a solution of humus and an alkali and treating said solution to the action of an acid to precipitate the pigment.

3. The process of forming a brown pigment which consists in treating lignite with an alkali, separating the solution from the insoluble matter, and precipitating the pigment from the alkaline solution by neutralizing with an acid.

Signed at New York in the county of New York and State of New York this 18th day of August, A. D. 1926.

GEORGE CHARLES LEWIS.